United States Patent

[11] 3,617,866

| [72] | Inventors | John Shillington Dowsett;<br>Russell David Leask, both of Copper Cliff, Ontario, Canada |
|---|---|---|
| [21] | Appl. No. | 831,833 |
| [22] | Filed | June 10, 1969 |
| [45] | Patented | Nov. 2, 1971 |
| [73] | Assignee | The International Company, Inc.<br>New York, N.Y. |
| [32] | Priority | Mar. 7, 1969 |
| [33] | | Canada |
| [31] | | 045045 |

[54] GEOPHYSICAL SURVEYING WITH AUDIO FREQUENCY ELECTROMAGNETIC FIELDS AND ORTHOGONAL RECEIVER COILS
16 Claims, 10 Drawing Figs.

| [52] | U.S. Cl. | 324/4, 324/6 |
|---|---|---|
| [51] | Int. Cl. | G01v 3/16 |
| [50] | Field of Search | 324/3, 4, 6 |

[56] References Cited
UNITED STATES PATENTS

| 1,794,666 | 3/1931 | Bieler et al. | 324/6 |
|---|---|---|---|
| 2,623,924 | 12/1952 | Cartler et al. | 324/6 X |
| 2,903,642 | 9/1959 | Seigel | 324/6 |
| 2,929,984 | 3/1960 | Puranen et al. | 324/6 |
| 3,015,060 | 12/1961 | McLauglin et al. | 324/4 |

FOREIGN PATENTS

| 654,474 | 12/1962 | Canada | 324/6 |
|---|---|---|---|
| 766,378 | 8/1967 | Canada | 324/6 |

*Primary Examiner*—Gerard R. Strecker
*Attorney*—Maurice L. Pinel

ABSTRACT: Method and apparatus for conducting electromagnetic geophysical surveys, including airborne electromagnetic surveys, to explore for electrically conductive ore bodies while radiating audiofrequency electromagnetic fields over the terrain being surveyed. Two mutually perpendicular receiver coils each pickup (or generate) electric signals from an electromagnetic field at one frequency and, advantageously, an additional receiver coil, or two additional receiver coils arranged as a mutually perpendicular pair, pickup signals from another field at a second frequency. Receiver coils in mutually perpendicular pairs are electromagnetically matched to provide mutually equal electromagnetic pickup capabilities and are disposed in a position of minimum mutual coupling. Signals from a matched pair of receiver coils are maintained in undistorted form and are subjected to a 90° phase shift and then combined to sum or add the signals vectorially to each other to obtain a resultant signal having a magnitude responsive to both the magnitude and the phase of secondary, possibly phase-shifted, fields when received with the primary field over terrain being surveyed and provide high discrimination of desired anomalous electromagnetic effect signals, such as occur above electrically conductive ore bodies, from undesired noise signals such as maneuver noise. Summing the receiver coil signals after 90° phase shift is introduced functions to suppress maneuver noise otherwise tending to arise during rotational variation of the orientation of a search coil in the transmitted field and also serves to enhance desired anomalous electromagnetic effects. In certain advantageous embodiments, additional signals are picked up at a second frequency, the magnitudes of signals received at the two frequencies are electrically compared and a resultant difference signal responsive to magnitude and phase effects of secondary fields, when present, is produced and provides especially high discrimination of desired anomalous effect signals over noise signals.

INVENTORS
JOHN SHILLINGTON DOWSETT
BY RUSSEL DAVID LEASK

M. L. Piniel
ATTORNEY

INVENTORS
JOHN SHILLINGTON DOWSETT
BY RUSSEL DAVID LEASK

M. L. Pinel
ATTORNEY

GEOPHYSICAL SURVEYING WITH AUDIO FREQUENCY ELECTROMAGNETIC FIELDS AND ORTHOGONAL RECEIVER COILS

The present invention relates to geophysical surveying and, more particularly, to methods and apparatus for conducting electromagnetic geophysical surveys.

Heretofore, general principles of electromagnetic surveying to explore for electrically conductive ore bodies have become well known in the art. For instance, theory and practice of this art are discussed in "Geophysical Exploration," by C. A. Heiland, Prentice-Hall, Inc., New York, 1946. It is understood that when a cyclically alternating or otherwise varying magnetic field (referred to as an "electromagnetic field" or a "primary field") is radiated over the terrain, the primary field normally penetrates the terrain and links with any electrically conductive bodies in the subsurface of the terrain, usually at least down to a depth of several hundred feet, or more, according to the strength and frequency of the field. Primary fields can be of audiofrequencies or radiofrequencies or others and can be radiated by passing an alternating current through a transmitter coil. In some special instances, naturally occurring earth transient fields are utilized as primary fields.

When the electromagnetic flux of a primary field links with a body of electrically conductive material, eddy currents are generated in the body and the thus-generated eddy currents radiate a secondary electromagnetic field which is of the same frequency as the primary field. Generally the secondary field is somewhat out of phase with the primary field and when an out-of-phase secondary field radiates into the primary field the resulting field is distorted in a manner sometimes referred to as "elliptically polarized." The phase shift of the secondary field is usually due to special electrical characteristics of the conductive body from which the secondary field is radiated and thus the phase shift, and also the distortion or elliptical polarization, can be indicative of the electrical characteristics, such as resistivity and inductivity of the body. Inasmuch as ore bodies of certain special compositions, e.g., electrically conductive sulfides, have special resistivity and inductive characteristics, phase-shift type distortions of electromagnetic fields over the terrain can be indicative of the location, and also of important geological characteristics, e.g., size, disposition, dispersion and composition, of subsurface ore bodies in the terrain. Such possibilities have led to the art of electromagnetic prospecting. Often when referring to electromagnetic prospecting, localized subterranean zones or bodies that have abnormal electrical conductivity characteristics are referred to simply as "anomalies;" similarly, electromagnetic effects of eddy currents generated in such anomalies are referred to as "anomalous effects" or "anomalous signals."

Heretofore, the art has endeavored to develop methods and apparatus for detecting valuable ore bodies by finding and analyzing anomalous effects in electromagnetic fields over terrain suspected of containing ore. Thus, search coils are used to generate electric signals from the electromagnetic fields and the signals are fed to additional receiver apparatus and analyzed for indications of geologically important anomalies in the terrain. Unfortunately, many anomalies are not commercially worthwhile ore bodies and various kinds of anomalous effects frequently arise from earth substances or structures other than useful ore, e.g., graphite, wet clay, conductive shear zones or barren sulfides. Thus electromagnetic prospecting has had serious difficulties of distinguishing between "ddsired" anomalous effects arising from desirable ore bodies and "undesired" anomalous effects caused by commercially unimportant anomalies, especially inasmuch as some desirable kinds of ore bodies give rise to only relatively weak anomalous effects. Moreover, search coils often generate undesired "noise" signals from extraneous electromagnetic fields or other causes, and thus, additional problems of discriminating between noise and desired signals are encountered.

Further problems are encountered when, in order to conduct geophysical surveys over large areas in economically short periods of time, the surveys are conducted with apparatus moving rapidly over the terrain. From a practical commercial viewpoint it is highly desirable to have apparatus and methods for geophysical surveying at high speeds, e.g., speeds of 70 or 80 or 100 miles per hour or more. Such needs involve problems of providing means for conducting sensitive, reliable, surveys with apparatus that is sufficiently compact and lightweight to enable high-speed transportation and operation, such as airborne operation. Additional needs in high speed geophysical surveying include the practical necessity for capability of rapidly generating and recording satisfactorily meaningful signal data and, among other things, need for overcoming a special noise difficulty referred to as "maneuver noise." When apparatus is moved rapidly over the terrain it is difficult or practically impossible to maintain constant orientation of the apparatus in relation to the terrain and, furthermore, in instances where one apparatus component is moved somewhat separately (without rigid attachment) from another, such as when a receiver is towed behind a transmitter in an aircraft, it is practically inevitable that the two components also move relatively to each other. For instance, when an electromagnetic receiver is towed behind an airborne transmitter there are frequent relative translational movements resulting in variations of horizontal and vertical distances between the receiver and transmitter, with consequent variation in angular elevation between receiver and transmitter, and also relative rotational movements such as when an airborne container (bird) carrying a receiver noses up or down in flight. Such relative translational and rotational movements, which are usually rather erratic, between a receiver and a primary field transmitter result in unwanted variations in receiver coil signals, termed maneuver noise. Overcoming or reducing maneuver noise effects is highly important in order to avoid having desired anomalous signals obscured by noise signals. Heretofore there were longstanding needs for methods and apparatus having strong discriminating power for holding noise to low levels and detecting desired anomalous effects with signals of relatively high strength in relation to noise, especially maneuver noise.

Although the geophysical art includes many attempts, for many years, to overcome the foregoing difficulties and other difficulties and disadvantages, none, insofar as we are aware was entirely successful in practice on a commercial prospecting scale.

There have now been discovered a method and an apparatus that have special advantages, including good discrimination of desired anomalous effect signals over undesired noise, for accomplishing high speed geophysical surveys.

It is an object of the present invention to provide a new process for geophysical surveying, including electromagnetic exploration for ore bodies.

A further object of the invention is to provide a new apparatus accomplishing geophysical surveys.

Other objects and advantages will become apparent from the following description taken in conjunction with the accompanying drawing in which.

The present invention contemplates an electromagnetic survey process, and apparatus useful therefor, comprising transmitting a primary electromagnetic field over the terrain from a moving transmitter coil, moving at a substantially constant distance from the moving transmitter a pair of mutually perpendicular receiver coils disposed in a position of zero (or minimum) mutual coupling to intercept an electromagnetic field resulting from the primary field and, if the terrain under survey contains a substantial electrically conductive anomaly, a secondary field generated from the primary field, generating from the intercepted resultant field electric signals in each of the receiver coils at the same frequency as the primary field frequency and responsive in phase and magnitude to the phase and magnitude of the resultant field, introducing a 90° shift in the phase relationship of the two receiver coil signals, combining the signals from the two receiver coils without distortion to produce a resultant signal responsive in phase and magnitude to the phase and the magnitude of the intercepted field and measuring the magnitude of the resultant signal. Advantageously, the resultant signal magnitude is continuously recorded, such as by having the resultant signal strength, e.g., DC voltage, continuously plotted by an automatic voltage recorder. The strength of the resultant signal is responsive to secondary field components, when present, in the intercepted field. Accordingly, it will be understood, especially by those skilled in the art of electromagnetic prospecting, that the magnitude of the resultant signal provides a highly significant indication of whether or not the terrain under survey contains an electrically conductive ore body and also provides additional useful information concerning the size, location and conductivity of a nearby ore body. In this connection, it is particularly desirable to compare the strengths of resultant signals obtained over electromagnetically barren ground.

In most embodiments, and very advantageously so, a primary field is radiated from a transmitting coil disposed with the coil axis in a vertical plane containing the line of movement of the transmitter. Also, the perpendicular receiver coils, which have the coil windings in mutually perpendicular planes, are oriented so that the line of intersection of the lanes of the coils is nominally horizontal and also perpendicular to the direction of movement of the coils; the axis of the transmitter coil is nominally oriented to pass through the point of intersection of the two receiving coil axes; and the nominal direction of movement of the receiver coils is parallel to and in the vertical plane of the direction of transmitter movement. Vertical and horizontal refer to positions in relation to the earth unless otherwise noted. It is to be understood that many of the orientations, directions, etc., relating to the apparatus and the process must be referred to in the nominal sense inasmuch as in practice of the invention the receiver is moved remotely, e.g., at a distance of 20 to 1,000 feet or more, and it is generally impractical to provide absolutely rigid attachment of receiver carrier to transmitter carrier. Accordingly, it is understood that when in use the apparatus components are usually maintained substantially in the nominal positionings and yet considerable movement of the receiver in relation to the transmitter and thus somewhat frequent divergence from the most ideal or nominal positionings of the coils is practically inevitable. Such relative movements between receiver and transmitter cause strong tendencies to create undesirable maneuver noise and the present invention provides, among other things, important advantages of overcoming certain maneuver noise difficulties.

The invention further contemplates specially advantageous embodiments wherein two primary fields are created by transmitting two frequencies from two transmitter coils moving simultaneously on one transmitter carrier. In these dual frequency embodiments of the invention, nominally: one transmitter coil is oriented to have the coil axis in the vertical plane containing the line of transmitter movement and the second transmitter coil is oriented with the coil winding parallel to the vertical plane containing the line of transmitter movement; at least three receiver coils are provided; two receiver coils are arranged in accordance with monofrequency embodiments of the invention with the two coils mutually perpendicular and on the first transmitter coil axis and with the coils connected to phase-shifting and signal-combining means in accordance with the invention; and, a third receiver coil tuned to the frequency of the second primary field is oriented coplanar (in the same plane or a nearby parallel plane) with the second transmitter coil. In dual-frequency three-coil operation the third receiver coil generates a signal from an electromagnetic field resulting from transmission from the second transmitter and the signal generated in the third coil is compared in magnitude with the signal resulting from the first and second coils to produce a resultant difference signal. Special advantages of dual-frequency three-coil embodiments include reduction of signal noise from changes in transmitter-to-receiver coupling resulting from changes of orientation or position of the receiver coils in respect to the transmitter coils and enhancement of anomalous effects of phase-shifted secondary fields.

While highly advantageous results are obtained with the three-coil system of the invention, further reduction of certain maneuver noise errors are obtained by providing a fourth coil to also receive and generate a signal from the second frequency field. In such embodiments, the fourth coil is oriented perpendicular to and in zero mutual coupling with the third coil and signals from the fourth coil and the third coil are combined, after introduction of a 90° phase-shift, and the resultant from the third coil and the fourth coil is compared with the resultant from the first coil and the second coil to produce a resultant difference signal.

Primary fields transmitted in the present invention are generally sinusoidal wave fields of about 10 Hertz Hz. or cycles per second c.p.s. to about 30,000 Hz., advantageously about 50 Hz. to about 5,000 Hz., referred to herein as audio frequencies.

For the purpose of giving those skilled in the art a better understanding and appreciation of the advantages of the invention the following illustrative descriptions and examples of the method and apparatus are given.

Figure 1:
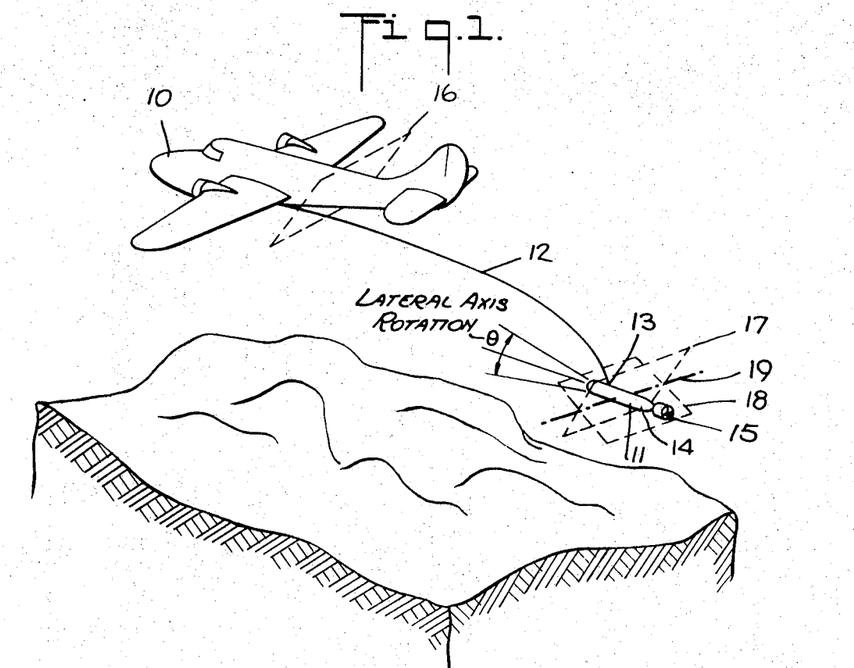
FIG. 1 illustrates an airborne practice of the invention.

Referring now to the drawing, FIG. 1 illustrates, among other things, planar positionings (nominal) of coils for transmitting and receiving in accordance with the invention. In conjunction with FIG. 1 it is noted that aircraft 10 is the transmitter carrier and bird 11 is the receiver carrier. The bird is towed by the aircraft with cable 12, which is attached to the bird at 13 and connected to a reel in the aircraft. The bird comprises container body 14 and a stabilizing means illustrated as vane 15. Areas 16, 17 and 18 (outlined with broken lines) are perspective views of rectangles that illustrate planes referred to hereinafter by the numbers associated with the areas. The aircraft carries a transmitter coil positioned with the coil windings parallel to plane 16 and the bird carries a first receiver coil and a second receiver coil which are mutually perpendicular and positioned with the coil windings parallel to planes 17 and 18 intersecting at line 19, which is perpendicular to a plane through the longitudinal axis of the receiver carrier. The aircraft and the bird are controlled, to the extent that is practical, to have line 19 perpendicular to a plane through the line of flight and parallel to the ground and to have the first receiver coil and the transmitter coil positioned along a common axis (the common axis positioning of transmitting coil and receiving coil is sometimes referred to as "coaxial" or "position of maximum coupling").

When performing surveys with moving apparatus such as that illustrated in FIG. 1, or with other moving apparatus not having a rigid connection between transmitter and receiver, the receiver carrier frequently maneuvers somewhat erratically, such as by nosing up or down and thus undergoing angular displacement by rotation about a lateral axis through the carrier, e.g., the displacement angle $\theta$ illustrated in connection with the double-arrow labeled "Lateral Axis Rotation" on FIG. 1. Since such carrier rotation also rotates search coils mounted in the carrier and causes variations in the angles at which the search coils intersect the flux of a surrounding electromagnetic field, thus varying the electromagnetic coupling of the coils to the field, lateral axis rotation presents serious maneuver noise problems. The present invention provides specially important advantages of overcoming maneuver noise difficulties. In a single-search coil used coaxially with a primary field transmitting coil, e.g., a coil with windings in plane 17 of FIG. 1, and excited only by a plane polarized primary field, the strength of the induced signal varies proportionately to the cosine of the angle of displacement in lateral axis rotation, inasmuch as the signal in the coil is represented by 1.

$S_1 = S \cos(wt) \cos\theta$ where $S_1$ = Instantaneous amplitude of signal in single (or first) coil $S$ = Maximum amplitude of signal in coil at maximum coupling $\omega$ = angular frequency of electromagnetic exciting field $t$ = time (usually in seconds)

$\theta$ = angular displacement by rotation about lateral horizontal axis.

Thus, the signal variation (or maneuver noise) due to such rotational maneuvering is very undesirably high when (not in accordance with the invention) only one search coil is employed. With the present invention this maneuver noise difficulty is completely, or at least very substantially, eliminated.

The present invention generates, in addition to the first coil signal, a second signal in a second zero-coupled mutually perpendicular coil having the same inductance as the first coil, introduces a 90° shift in the phase between the signals and then combines the signals to produce a resultant signal. The signal in the second coil varies as the sine of the displacement angle and thus when the phase is shifted with a 90° increase in phase angle, the resultant signal produced in accordance with the invention is represented by 2.

$SR = S \cos(\omega t) \cos\theta = S \cos(\omega t - 90) \sin\theta$ where $SR$ = Instantaneous amplitude of resultant signal $S$ = Maximum amplitude of signal in either coil at maximum coupling.

Equation (2) is readily simplified to equation (3) relationship follows:

$SR = S[\cos(\omega t) \cos\theta = \sin(\omega t) \sin\theta]$

3. $SR = S \cos(\omega t - \theta)$

From equation (3) it is evident that the resultant signal provided by the present invention is a simple cosine function under conditions where the rate of variation of angle theta is much slower than the angular frequency omega ($\omega$). This is the actual realistic situation to be met in geophysical surveying, and thus there is practically complete elimination of amplitude error from variation of theta. Thus, the invention achieves a great advantage of overcoming lateral axis maneuver noise.

In view of the foregoing discussion relating to equations (1), (2) and (3) it is also evident that the benefits of overcoming maneuver noise are also obtained when the phase of the second coil signal is shifted by a 90° decrease in phase and thus, for obtaining these advantages, the 90° phase shift can be either an increase or a decrease in phase angle.

It is further evident that each of the coils in the two-coil receiver circuit of the invention is adapted to generate equal electromotive forces (e.m.f.) when the coils are under identical excitation conditions. Accordingly, it is to be understood that usually the two coils are essentially identical in size and inductance and if the coils are different, e.g., in size or inductance, the circuit is adapted to compensate for the difference by amplification, attenuation, or other compensating means. The capability of a coil to generate an e.m.f. when excited by an electromagnetic field may be referred to as "pickup capability" and similar reference may be made to circuits comprising one or more pickup coils and, possibly, compensating means.

Moreover, it is evident from equation (3) that it is not necessary for the displacement angle theta to be zero in order to obtain the benefits of overcoming maneuver noise, inasmuch as inserting a constant positive or negative value in theta merely introduces a constant phase shift into the resultant signal. Thus, good results are obtainable with the axes of the coils angularly displaced from the coaxial alignment position and from the perpendicular to coaxial alignment, provided that the line defined by the intersection of the two perpendicular planes of the coil windings is substantially horizontal and perpendicular to the direction of receiver movements.

The two-coil receiving method and receiver apparatus of the invention also provide advantages of reducing maneuver noise during spacial displacement maneuvers such as when an airborne bird moves relatively fore or aft, or up or down, in relation to the transmitting aircraft. With the two-coil system of the invention, spacial displacement maneuver noise is desirably low and substantially diminished in comparison with the noise arising from spacial maneuver when receiving with a single coaxial coil.

Figure 2:
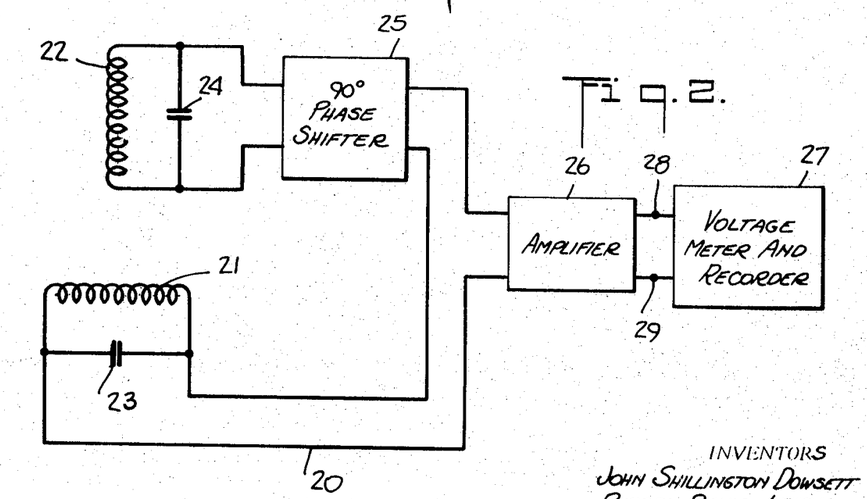
FIGS. 2 and 3 depict, respectively, electric circuits of two-coil and three-coil receivers of the invention.

A two-coil receiver circuit in apparatus for receiving, phase-shifting and combining signals in a monofrequency embodiment of the invention is depicted in FIG. 2, which illustrates circuit 20 comprising mutually perpendicular coils 21 and 22, tuning capacitors 23 and 24 across coils 21 and 22, respectively, 90° phase shifter 25 and amplifier 26. Also illustrated is signal strength measurer and recorder 27 which is connected to receive the amplifier output at terminals 28 and 29. Coils 21 and 22 are of equally matched zero-coupled inductances and are tuned in conjunction with the associated capacitors for minimum power loss at the frequency of the transmitted field that is to be received, e.g., 800 Hz. The phase shifter can be employed satisfactorily with either of the coils. Phase-shifting components known in the art for producing 90° phase shifts with little or no voltage loss can be utilized for phase shifter 25. Generally, unless otherwise noted, amplifiers in apparatus of the invention are audio frequency amplifiers having linear, nonlimiting, amplifying characteristics with very little or no distortion of sinusoidal signals.

An advantageous embodiment of the monofrequency two-coil receiving system is provided with a modification of circuit 20 wherein phase shifter 25 is deleted, the coil 22 leads are carried through to connect one side of coil 22 to the amplifier and connect the other side of coil 22 to coil 21, and wherein the coils and the associated capacitors are tuned one to the upper half-power point and one to the lower half-power point at the transmitted frequency to thereby provide a voltage which leads the exciting flux by 45° in one coil and a voltage which lags the exciting flux by 45° in the other coil and thus introduces the 90° shift in phase. Half-power point tuned embodiments of the invention have significant advantages; complicated phase-shifting networks are avoided; electrical noise in the low level stages of the apparatus are kept to a minimum; and, inasmuch as high-Q coils are generally utilized for the search coils in the receivers of the invention, the phase stability of the circuits are greatly improved off resonance.

For carrying the invention into practice, e.g., with embodiments such as are depicted in FIG. 2 or with half-power point tuned embodiments, receiver coils 21 and 22 are mounted in a carrier craft adapted to be moved along a longitudinal axis and the receiver coils are oriented with the coil windings in mutually perpendicular planes that intersect in a line (coil-plane intersection line) perpendicular to the longitudinal axis of the receiver carrier. Carrier craft for the receiver advantageously have stabilizing means, e.g., vanes or suspension over center-of-gravity, for inhibiting roll of the carrier around the longitudinal axis and for maintaining the two receiver coils in an orientation where the coil-plane intersection line is near horizontal. Usually amplifier 26 and the means for coil tuning and for phase shifting, e.g., capacitors 23 and 24 with or without phase shifter 23, are mounted in the receiver carrier craft and the voltmeter and recorder components are mounted in the transmitter carrier craft. In such and similar instances, e.g., airborne operation, the amplifier output can be sent to the towing aircraft from amplifier terminals 28 and 29 in the bird via a tow cable and, if desired, can be imposed as a modulation on a carrier wave in the bird and demodulated in the aircraft, or may even be telemetered or sent by radio.

Figure 3:
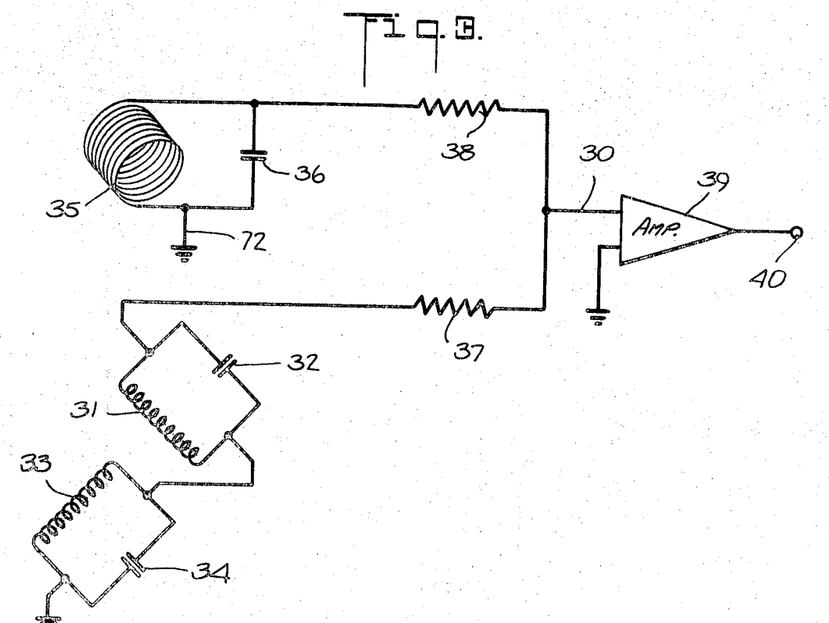
Figure 4:
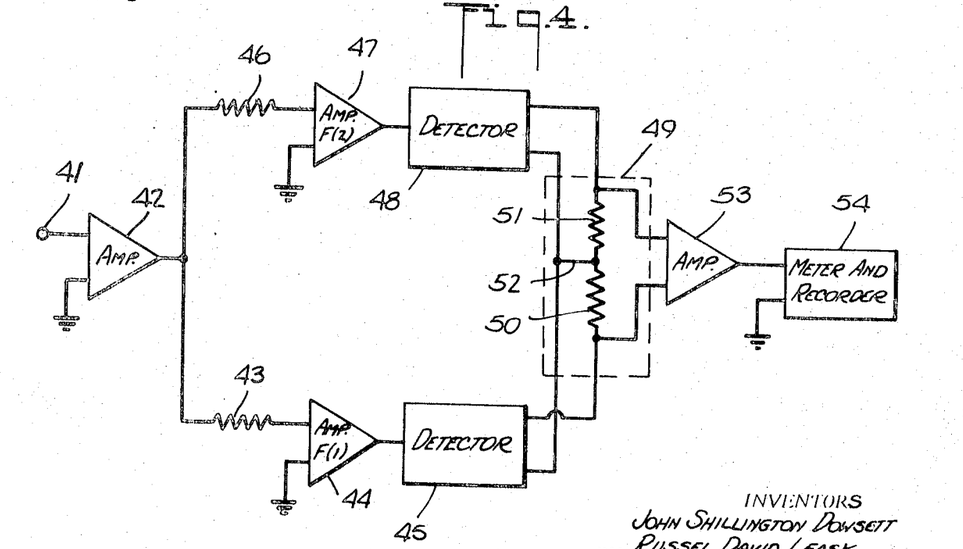
FIG. 4 depicts an electric circuit for signal analysis apparatus adapted for use in the invention.
Figure 5:
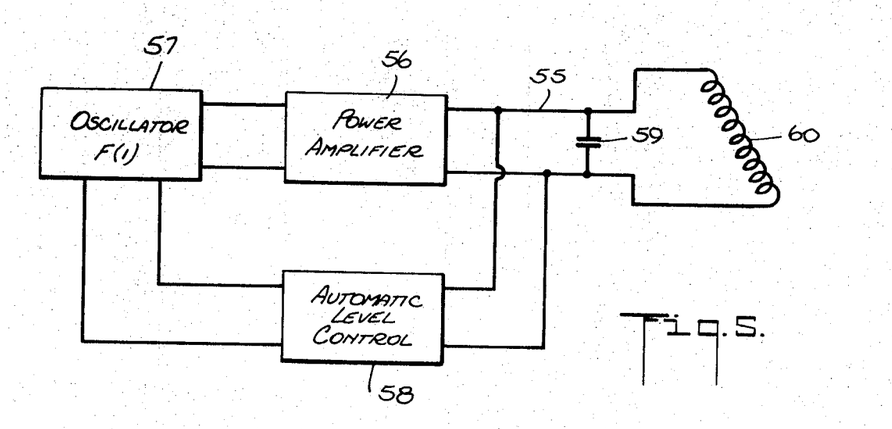
FIGS. 5 and 6 illustrate electric circuits for electromagnetic field transmitters utilized in the invention.
Figures 6, 9:
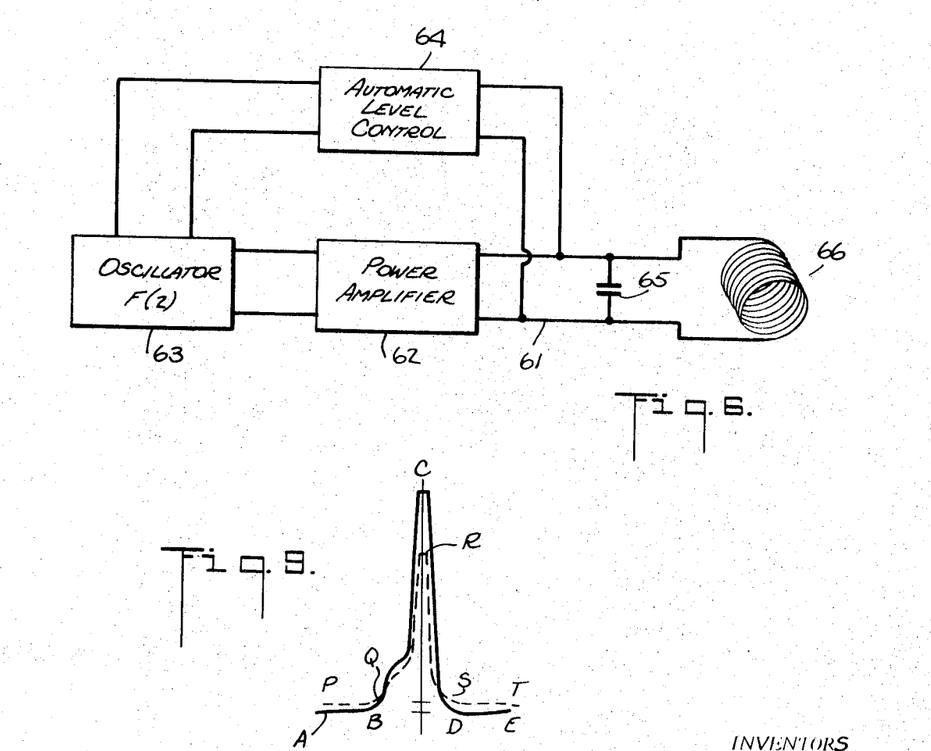
FIG. 9 shows a chart having a signal detection record (Plot A-E) obtained in geophysical surveying practice of the invention and also having another signal detection record (Plot P-T) obtained in a geophysical survey not in accordance with the invention.
Figure 7:
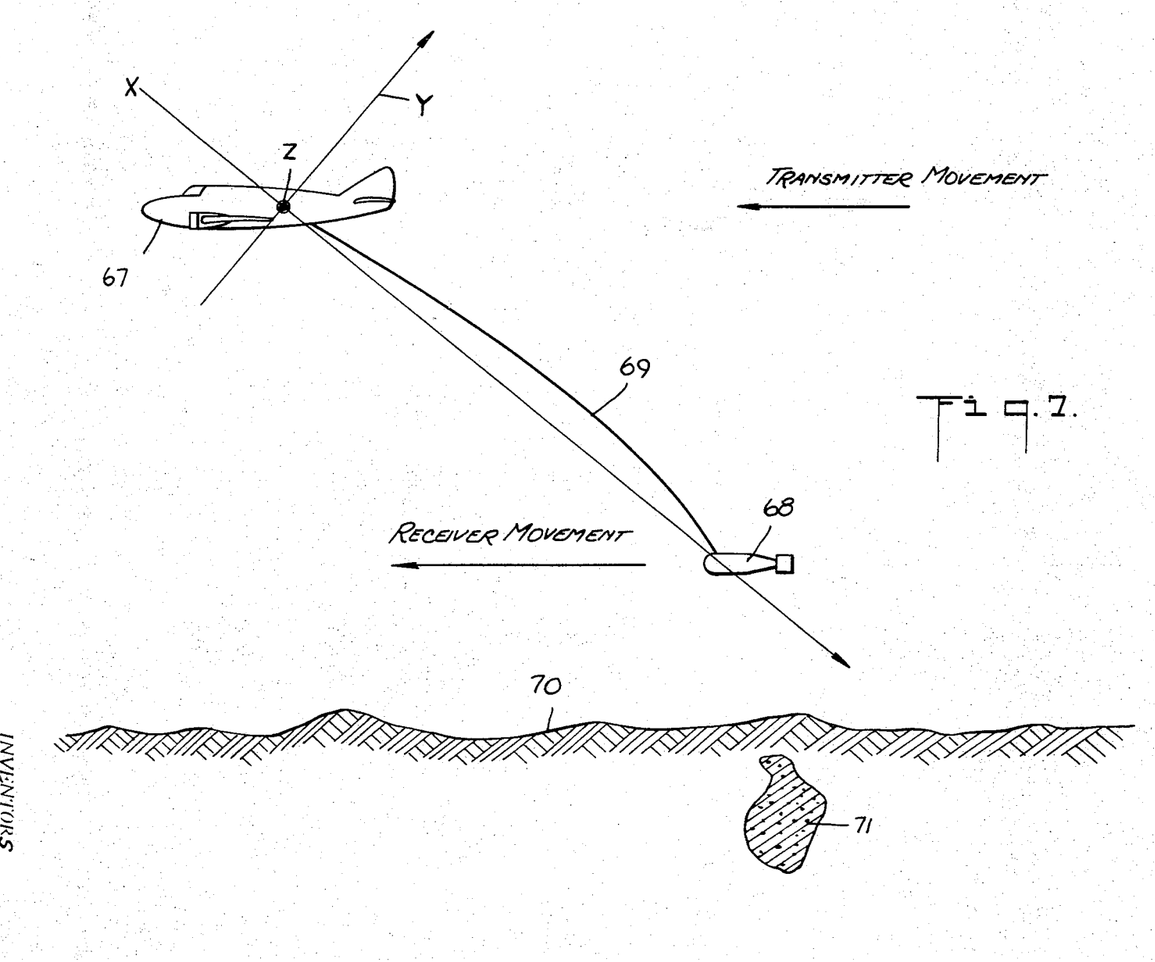
FIG. 7 also illustrates an airborne practice of the invention and shows reference axes in relation to an airborne practice of the invention.

For obtaining further advantages over monofrequency embodiments, the invention provides special dual frequency embodiments using at least two transmitter and three receiver coils. Circuitry for practicing dual-frequency three-coil receiver embodiments of the invention is illustrated in FIGS. 3 and 4. Transmitter circuits for use with dual-frequency embodiments are depicted in FIGS. 5 and 6; such transmitter circuits, e.g., the circuit of FIG. 5, can also be used with monofrequdncy two-coil receivers of the invention. FIG. 7 shows orientations of three mutually perpendicular reference axes "X," "Y" and "Z" in relation to positioning and movement of transmitter carriers and receiver carriers in practice of the invention. The X and Y axes are in the plane of FIG. 7; the X-axis is oriented through the transmitter and receiver; and the Z-axis is perpendicular thereto. FIG. 3 depicts circuit 30. which is a dual-frequency three-coil receiving circuit comprising first and second receiving coils 31 and 33, with tuning capacitors 32 and 34, respectively, for receiving a first primary field frequency (F-1), third receiving coil 35 with tuning capacitor 36 for receiving a second primary field frequency (F-2), isolating resistors 37 and 38, amplifier 39 and output terminal 40. Coils 31 and 33 are disposed perpendicularly and with minimum coupling to each other. The inductance-capacitance combinations of coil 31 and capacitor 32 and of coil 33 and capacitor 34 are tuned to half-power points at frequency F-1 and connected in series to the amplifier, thus being adapted to introduce a 90° phase shift between signals picked up in receiver coils 31 and 33 and to vectorially add the receiver coil signals with the required 90° shift in phase. (It will be understood that instead of having coils 31 and 33 tuned to half-power points, this circuit could have these coils both tuned to F-1 and have a 90° phase shifter component provided similarly to circuit 20 of FIG. 2). Coil 35 and capacitor 36 are tuned to F-2; amplifier 39 is a broad band amplifier having a bandwidth characteristic sufficiently broad for amplifying and passing the F-1 and F-2 frequencies to terminal 40.

FIG. 4 depicts a circuit with signal analysis apparatus that is advantageously carried in the aircraft (or other transmitter carrier) and comprises, in connection with terminal 41: broad band isolation amplifier 42; an F-1 frequency path through resistor 43, narrow band amplifier 44 and DC detector 45; an F-2 frequency path through resistor 46, narrow band amplifier 47 and DC detector 48; differential network 49 comprising resistors 50 and 51 and lead 52; difference signal isolation amplifier 53; and DC meter and recorder 54.

Primary electromagnetic fields for geophysical surveying in accordance with the invention can be transmitted using known methods and apparatus for radiating electromagnetic fields in limited audiofrequency bandwidths at accurately controlled constant power levels and frequencies. Apparatus for generating two primary fields at audiofrequencies F-1 and F-2 from a moving transmitter carrier is exemplified in FIGS. 5 and 6, respectively, wherein: FIG. 5 illustrates F-1 frequency transmitter circuit 55 comprising power amplifier 56, audiofrequency oscillator 57, automatic level (amplitude) control 58, tuning capacitor 59 and F-1 transmitter coil 60; and FIG. 6 illustrates F-2 frequency transmitter circuit 61 comprising power amplifier 62, audiofrequency oscillator 63, automatic level control 64, tuning capacitor 65 and F-2 transmitter coil 66. The transmitting coils are tuned to the primary frequencies F-1 and F-2 with the tuning capacitors 59 and 65, respectively. For good results, transmitters employed for radiating the primary fields have highly stable frequency and amplitude transmission characteristics.

Referring now to FIG. 7, transmitter carrier 67 and receiver carrier 68 (with tow cable 69) are shown in movement in the X,Y-plane over terrain 70 containing electrical anomaly 71, e.g., a metal-sulfide ore body characterized by relatively high electrical conductivity. In certain advantageous dual-frequency embodiments of the invention, transmitters for radiating two primary fields F-1 and F-2, are borne in a transmitter carrier having the transmitter coils mounted in (or on) the transmitter craft and oriented (nominally) with the axis of the F-1 transmitter coil in the X,Y-plane and along, or closely parallel to, the X-axis and with the windings of the F-2 transmitter coil parallel to the X,Y-plane. Dual-frequency three-coil receiver embodiments of the invention, such as are described in conjunction with FIG. 3, are moved over the terrain in a receiver carrier having the first and second receiver coils, which are for picking up signals resulting from the F-1 transmission, oriented with the axis of the first coil in the X,Y-plane and with the axis of the second coil perpendicular to the first coil axis and in the X,Y-plane and also having the third receiver coil, which is for picking up signals resulting from the F-2 transmission, oriented with the coil windings in the X,Y-plane. Thus, the third receiver coil is coplanar with the F-2 transmitter coil. With the axes of the first coil and the second coil in the X,Y-plane and in perpendicular zero-coupled relationship to each other, the benefits the invention provides in overcoming lateral axis maneuver noise are obtained at all orientations of the first and second coil axes to the X-axis As a practical matter it is to be recognized that various structural and operational considerations, e.g., space occupied by apparatus, electrical wiring difficulties, survey maneuvers, etc., commonly prevent providing exactly the axial and planar orientations recommended herein and that these are optimum objectives but not absolute requirements. Accordingly, it is to be understood that in general, at least if reasonably good axial and planar relationships are provided, the invention achieves good results.

In an example of surveying with the apparatus described in conjunction with FIGS. 3 through 7, two transmitter systems having circuits 55 and 61 of FIGS. 5 and 6 are carried in a fixed-wing aircraft 67 and a dual-frequency three-coil receiver with circuit 30 of FIG. 3 is carried in airborne bird 68 towed by 500 foot cable 69 behind the aircraft. Signal analysis apparatus depicted in FIG. 4 is carried in the aircraft and electrically connected to the receiver output with a communication cable in the tow cable. F-1 transmitter coil 60 and first receiver coil 31 are oriented coaxially along the X-axis second receiver coil 33 is oriented with the windings parallel to the X,Z-plane and F-2 transmitter coil and third receiver coil 35 are coplanarly oriented with the coil windings parallel to the X,Y-plane. Electric power is furnished to the transmitters and receivers from a generator in the towing airplane. A sinusoidal current at an F-1 frequency of 700 Hz. is passed through transmitter coil 60 by power amplifier 56. The alternating frequency of the current through transmitter coil 60 is initiated and accurately controlled by oscillator 57 and the amplitude of the current is maintained accurately at a constant level by automatic level control 58. Similarly, a sinusoidal current at an F-2 frequency of 300 Hz. is passed through F-2 transmitter coil 66 from power amplifier 62 with accurate control of frequency and amplitude by oscillator 63 and automatic level control 64, respectively. Thus, two primary fields (the F-1 field and the F-2 field) are simultaneously radiated from the two moving transmitter coils 60 and 66.

The resultants of primary fields F-1 and F-2 and of any secondary fields radiated from eddy currents generated by the primary fields in electrically conductive anomalies, e.g., ore body 71, (if such are present in the reception vicinity of the apparatus) are intercepted by the moving receiver coils 31, 33 and 37. The F-1 resultant field develops signal voltages S-1 and S-2 across the terminals of coils 31 and 33, which are half-power point tuned at frequency F-1 and are connected in series through isolation resistor 37 to amplifier 39. In view of the special tuning and connection of coils 31 and 33, the signal voltages S-1 and S-2 are vectorially added at 90° and amplified in amplifier 39 for transmission to the airplane from terminal 40. Also, the F-2 resultant field develops a signal voltage S-3 across the terminals of third receiver coil 35 and the S-3 signal is also amplified in amplifier 39 and fed to terminal 40 for transmission to the airplane. The amplifier output at terminal 40, which comprises the signal resulting from vectorially adding S-1 and S-2 (sometimes referred to as signal SR) and also comprises S-3, is transmitted in the amplified form via a communication cable in tow cable 69 and received at terminal 41 in the airplane.

Referring now to FIG. 4, signals arriving at terminal 41 are passed through broad band isolation amplifier 42 and then the F-1 and F-2 frequencies are separated from each other by sending the output of amplifier 42 through the narrow band pass amplifiers 44 and 47. Amplifier 44 passes F-1 frequency signals and rejects F-2 frequency signals; thus, the output of amplifier 44 contains the amplified form of the resultant signal SR developed from coils 31 and 33. Similarly, amplifier 47 passes F-2 frequency signals and rejects F-1 frequency signals; thus, the output of amplifier 47 contains the amplified form of the S-3 signal developed from coil 35. The signals at the output ends of amplifiers 44 and 47 are converted to DC in detectors 45 and 48 and then subtracted from each other in resistor network 49 to produce a difference signal (SDR). The difference signal SDR is passed through isolation amplifier 53 and the magnitude of signal SDR is continuously measured and recorded in meter and recorder component 54.

Inasmuch as signal SDR is a dependent function of the resultant electromagnetic fields intercepted by the receiver coils, the presence of any substantial secondary field components, including phase-shifted secondary components, (which may be referred to as anomalous electromagnetic effects) in the intercepted fields influences the SDR signal magnitude. Accordingly, where the transmitter and receiver move over a substantial electrical anomaly, the SDR magnitude inevitably varies substantially from that obtained while moving over "barren" (without electrical anomalies) terrain. Thus, unusual variations of the SDR magnitude are highly indicative of electrical anomalies in the terrain under survey. For instance, an increase in SDR indicative of a change in field strength at bird 68 of 0.5 percent or greater can be indicative of the presence of a conductive sulfide body.

Dual-frequency three-coil embodiments of the invention provide especially good discrimination of signal variations due to anomalous electromagnetic effects in contrast to noise background. Maneuver noise is held to very advantageously low levels. The virtues of the monofrequency two-coil receiver pointed out hereinbefore in regard to greatly reducing rotational maneuver noise are operative through the two coils in the F-1 path of the three coil receiver. Additionally, dual-frequency three-coil embodiments provide further advantages of overcoming translational (or spacial) maneuver noise. For instance, computer program calculations made in view of the present invention show that in a situation where a bird carrying a dual-frequency three-coil receiver having circuits and apparatus in accordance with the invention as described in conjunction with FIG. 3 is towed at a distance of 460 feet behind, and at an angle of 24° below, an airplane carrying dual-frequency transmitter apparatus and signal analysis apparatus in accordance with FIGS. 5 and 6 and FIG. 4, respectively, then: if the bird maneuvers horizontally forward 40 feet from its nominal position in relation to the transmitters (in the airplane), the change in the magnitude of the SDR signal, which is the resultant produced using this embodiment of the dual-frequency three-coil system of the invention, is equivalent to a change of only 0.07 percent in the strength of one of the transmitted fields. Similarly, if the bird maneuvers 40 feet downwards from its nominal position the change in the magnitude of the SDR signal is equivalent to a change of only 0.19 percent in the strength of one of the transmitted fields. For comparison, to obtain a quantitative measure of advantages of the dual-frequency three-coil embodiment of the invention over a different geophysical surveying system not in accordance with the invention, the same kind of computer calculations were programmed for the same maneuver situations to obtain comparable maneuver noise signal data in operation of a dual-frequency two-coil system (identified herein as 2F2C) having the same two transmitters employed with the foregoing dual-frequency three-coil embodiment and having a two-coil receiver which, not in accordance with the present invention, does not have the 90° phase shifting means and the "second coil" that the invention provides for receiving the F-1 frequency, but which is otherwise the same as the foregoing dual-frequency three-coil embodiment. In other words, the 2F2C system has an F-1 transmitter coil and an F-1 receiver coil operating on the F-1 frequency and an F-2 transmitter coil and on F-2 receiver coil operating on the F-2 frequency with the F-1 transmitter and receiver coils oriented coaxially to the X-axis and the F-2 transmitter and receiver coils oriented coplanarly parallel to the X,Y-plane and has a signal analysis circuit in accordance with FIG. 4. Signal changes which occur as maneuver noise in the 2F2C receiver during the same maneuvers from the same neutral position referred to hereinbefore in regard to maneuver of the receiver of the invention are: for a translational maneuver of 40 feet horizontally forward, the signal change is 0.28 percent; for a translational maneuver of 40 feet downward, the signal change is 78 percent.

In light of the foregoing it is evident that in the foregoing comparative analysis of maneuver noise arising from translational maneuvers of bird in relation to airplane, the dual-frequency three-coil embodiment of the invention achieves important noise reduction advantages of a 75 percent reduction in horizontal maneuver noise and a 76 percent reduction in vertical maneuver noise in comparison with the dual-frequency two-coil 2F2C transmitter and receiver system that is not in accordance with the invention.

Of additional benefit, the invention also has advantages of enhancing desired signal variations that arise from certain desirable anomalous effects, particularly secondary field components characterized by moderate to strong phase shifts in relation to the primary field. These anomalous effect enhancement advantages are obtained with monofrequency two-coil embodiments and with the two-coil F-1 path of dual-frequency three-coil or four-coil embodiments. An example of enhancement of a desired anomalous effect is illustrated in the vectorial diagram in FIG. 8, which illustrates vectorial addition of primary and secondary field signal components in two-coil circuits of the invention as described in conjunction with FIG. 2. The diagram in FIG. 8 pertains to electromagnetic field reception and signal development in a moving receiver of the invention wherein: the first receiver coil 21 is oriented axially on the X-axis and is receiving an F-1 frequency primary field from a moving transmitter coil oriented coaxially on the X-axis and is also receiving at the F-1 frequency a 45° phase-shifted secondary field generated by the primary field in an electrical anomaly such as a metal-sulfide ore body; and, the axis of the second receiver coil is oriented parallel to the Y-axis, thus being orthoplanar and in the position of zero-coupling to the first receiver coil and to the transmitter coil, and is receiving the secondary field. Accordingly, a first-coil signal comprising a primary field signal component and a secondary field signal component is developed in the first receiver coil and a second-coil signal is developed with a component of the secondary field and no component of the primary field in the second coil; thus in the circuit of Fig. 2 the total second-coil signal is essentially the secondary field signal in the second coil and the second-coil signal is in-phase with the secondary component of the first coil signal.

Figure 8:
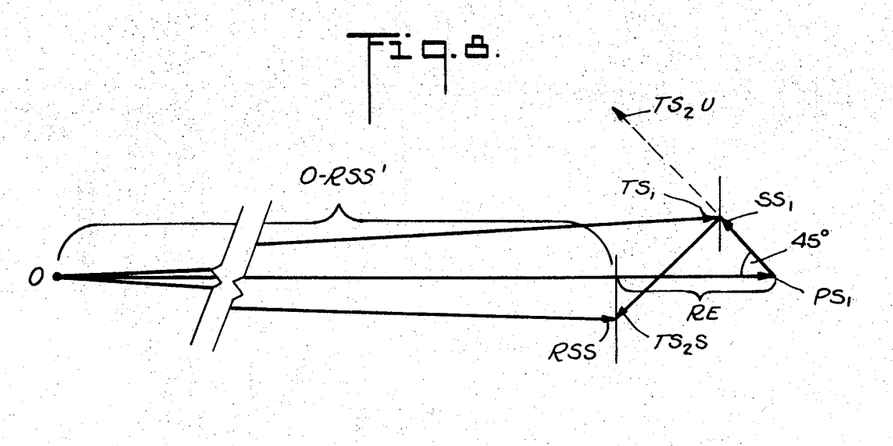
FIG. 8 is a vector diagram illustrating vectors of receiver coil signals generated in accordance with he invention.

Referring now to Fig. 8, the vectors therein represent phases and magnitudes of signals and signal components in relation to origin O and to the phase of the primary signal, which is the reference phase for the vector relationships as follows:

$TS_1$  Total Signal in the First Receiver Coil
$PS_1$  Primary Signal Component in First Receiver Coil
$SS_1$  Secondary signal Component in First Receiver Coil
$TS_2U$  Total (All Secondary) Signal in Second Receiver Coil Before 90° Phase Shifting (Unshifted), i.e., in Phase With $SS_1$ TS₂S  Total (All Secondary) Signal in Second Receiver coil Shifted 90° in Opposition to Primary Signal RSS  Resultant Signal With 90° Phase Shifting of second Coil Signal.

Also in Fig. 8, the distance O-RSS¹ represents the magnitude of RSS, and RE, which is the difference in magnitude of RSS from PS₁, represents the resulting anomalous effect of the secondary field, or, in other words, the resultant signal variation due to the secondary field on the two-coil receiving system. Of course, when no secondary field is present, the first coil signal is all from the primary field and TS₁ is the same as PS₁. In view of Fig. 8 and the accompanying description herein, it is evident e.g., by comparison of RE to the difference in magnitude of PS₁ and TS₁, that the anomalous effect of the aforereferred to sulfide ore body is substantially enhanced with the two-coil phase-shifting receiver of the present invention. While these signal enchancement advantages have been described in conjunction with circuit 20 of Fig. 2 and the vector diagram of Fig. 8 it will be understood that these advantages are also provided with half-power point tuned receivers in accordance with the invention, including three-coil or Four-coil receivers having the half-power point tuned circuits depicted in Fig. 3 or Fig. 10, respectively.

It is evident the two-coil, 90° phase shifting, receiving method and apparatus of the invention will also provide advantages in reducing errors caused by errors in orientation or position and/or in enchancing anomalous effects in stationary geophysical surveying, such as is conducted with amplitude measuring ground geophysical exploration instruments.

In an example of an airborne geophysical survey (Survey A-E) in accordance with the invention, a bird carrying a dual-frequency three-coil receiver was towed about 420 feet behind and about 200 feet below in airplane flying at about 115 miles per hour at an altitude of about 500 feet over terrain known to contain an electrically conductive nickeliferous sulfide body (sulfide body WM) at a known location. The towing airplane carried signal analysis apparatus, including a DC voltage recorder, and two audiofrequency transmitters. The receiver, transmitters and signal analysis apparatus were essentially as described and illustrated herein in conjunction with Figs. 3 through 6. The airplane carried the transmitter coils with the axis of the first transmitter coil in the X,Y-plane and inclined about 24° below the horizontal and the axis of the second transmitter coil perpendicular to the X,Y-plane; in the bird the first and second receiver coils were oriented with the axes of the two coils mutually perpendicular and both parallel to the X,Y-plane, the axis of the first coil being about horizontal, and the third receiver coil was oriented with the coil axis perpendicular to the X,Y-plane. A 700 Hz. primary field was radiated from the first transmitter coil and a 300 Hz. primary field was radiated from the second, coplanar, transmitter coil. While being flown over known barren terrain prior to approaching the vicinity of the ore body, the primary fields were intercepted by the receiver coils. Electric signals alternating at 700 Hz. were generated in the first receiver coil and in the second, orthoplanar, receiver coil while intercepting the 700 Hz. primary field (the "first" primary field) and electric signals alternating at 300 Hz. were generated in the third, coplanar, receiver coil while intercepting the 300 Hz. primary field (the "second" primary field). The first and second receiver coils had been tuned to half-power points of the 700 Hz. transmitted frequency. Accordingly, during reception of the first primary field a 90° phase shift was introduced between the first and second receiver coil signals and the signals were then vectorially added. The 700 Hz. signal and the 300 Hz. signal were amplified in the bird, transmitted together to the airplane through a communication cable in the tow cable and then further processed in the signal analysis apparatus by amplification, frequency separation, rectification and subtraction to produce a resultant difference signal which was fed into a DC voltmeter-recorder. Thus, the magnitude of the resultant difference signal was continuously plotted as a primary base line on the recorder chart while transmitting and receiving in flight over barren terrain. When the aircraft and the bird moved over the ore body, phase-shifted secondary fields were generated from the primary field and thus secondary field components were introduced into the receiver coil signals. A relatively strong secondary component was developed in the second coil signal. The secondary field effect was enhanced by vectorial addition of the half-power, point tuned receiver coil circuit. When the vectorially combined first and second coil signals were processed with the third coil signal through the signal analysis circuits and plotted on the record chart in the airplane, a very distinct change in the resultant difference signal was evident while the bird moved over the ore body. Referring now to FIG. 9 of the drawing, the solid line from A to E shows the record line plotted by the recorder during the flight. The portions from A to B and from D to E illustrate the uniform, low-noise, signal magnitude obtained over barren terrain and the sharply peaked portion from B through C to D shows the highly distinct change in magnitude while passing over the ore body. Thus, the solid record line ABCDE in FIG. 9 shows that in the foregoing example of an in-flight survey, a dual-frequency three-coil embodiment of the invention accomplished highly discriminating detection of the ore body and also held signal noise to an advantageously low level.

Also, in FIG. 9, the broken line P-T shows results of another airborne geophysical survey (Survey P-T) not in accordance with the invention. Survey P-T was performed with a dual-frequency two-coil 2F2C receiver carried in an airborne bird towed over sulfide body WM by an airplane at essentially the same flight conditions and carrying two audiofrequency transmitters radiating two primary fields, at essentially the same transmitting conditions as in Survey A-E, the first field being transmitted at 1,200 Hz. and the second at 300 Hz. A difference signal resulting from reception of the primary fields when flying over barren terrain and of the primary and also secondary fields when flying over the body WM with the 2F2C receiver was developed by transmitting the 2F2C receiver signals via the tow cable to the airplane and then passing the signals through signal analysis apparatus as in Survey A-E. The difference signal obtained with Survey P-T was continuously plotted by a DC voltage recorder and is shown by line PQRST in FIG. 9. (In referring to such plots, the vertical distances of the peaks of such plots above the background level are referred to as the "amplitudes" of the plotted anomalies.). Comparison of the A-E survey plot obtained in practice of the invention versus the P-T survey plot obtained using the 2F2C receiver shows the dual-frequency three-coil receiver of the invention achieved a very substantial advantage of providing a much stronger detection of the ore body than that provided with the 2F2C receiver. It is particularly notable that the amplitude of the anomaly of plot A-E is at least 40° greater than the amplitude of the anomaly of plot P-T.

Figure 10:
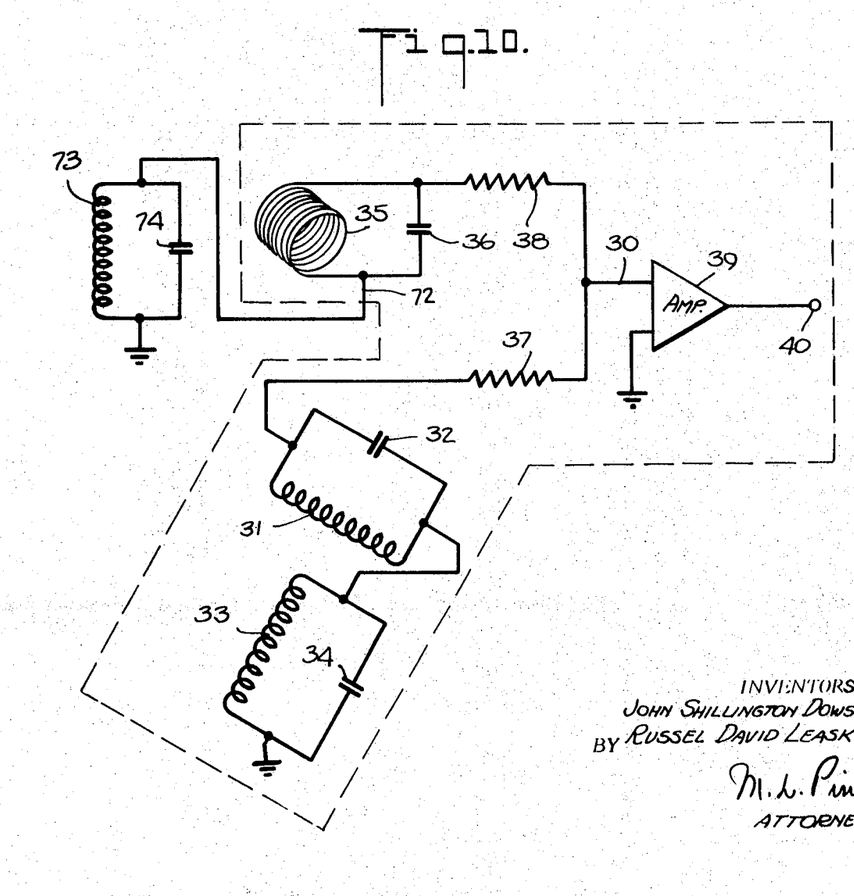
FIG. 10 depicts an electric circuit of a four-coil receiver of the invention.

Still further advantages, including reduction of longitudinal maneuver (roll maneuver about the longitudinal axis of the carrier) noise and of yaw noise from the third coil, can be obtained with a dual-frequency four-coil embodiment of the invention. FIG. 10 depicts an illustrative diagram of a dual-frequency four-coil receiver circuit which, in accordance with the invention, comprises the circuit 30 described and illustrated herein in conjunction with FIG. 3 and additionally comprises fourth receiver coil 73 and tuning capacitor 74 connected to circuit 30 in place of ground lead 72 of circuit 30. Third coil 35 and fourth coil 73 are tuned with the associated capacitors to the half-power points at the F—2 frequency to provide for a 90° shift in phase prior to vectorial addition of the third coil signal and the fourth coil signal. The vectorially combined third and fourth coil signals, which are at the F-2 frequency, are amplified in broad band amplifier 39 and arrive at output terminal 40 along with the vectorially combined and amplified F-1 frequency signals from first receiver coil 31 and second receiver coil 33. From terminal 40 the signals are transmitted to signal analysis apparatus for comparing the magnitude of the F-1 and F-2 signals and producing a resultant difference signal and then measuring, and advantageously recording, the strength of the difference signal, e.g., by transmitting the F-1 and F-2 signals to input terminal 41 of the signal analysis apparatus depicted in FIG. 4 and producing, measuring and recording a resultant difference signal (SDR) as described and illustrated in conjunction with FIG. 4. It is to be understood that the invention can employ means for separating the frequencies, or for amplifying or rectifying the signals, or for subtracting or otherwise comparing the signals, that are known to those skilled in the art, e.g., U.S. Pat. No. 2,623,924 and/or "Radio Engineers' Handbook,"F. E. Terman, McGraw-Hill Inc., N.Y. In operation, the third and fourth coils are oriented perpendicular to each other in zero-coupling relationship, with the plane of the third coil windings parallel to the X,Y-plane and with the plane of the fourth coil windings perpendicular to the X,Y-plane. For example, the plane of the fourth coil windings is horizontal. Combining the third coil signal and the fourth coil signal with 90° phase shifting (by half-power point tuning or other 90° phase shift means) in the present invention practically eliminates or at least greatly reduces roll manuever noise in the F-2 frequency path in essentially the same manner that lateral axis rotation noise is overcome as described and illustrated hereinbefore in conjunction with equations (1), (2) and (3) and FIG. 1 of the drawing and also reduces noise in the resultant difference signal. Similarly, advantages of reducing yaw manuever noise are obtained when the plane of the forth coil windings is vertical. When the fourth coil is inclined with the plane of the windings between the vertical and the horizontal, a combination of roll noise reduction and yaw noise reduction is obtained.

The present invention is particularly applicable to airborne geophysical surveying for detection of electrically conductive ore bodies such as nickel-sulfide ore bodies. Also, the invention is generally applicable to geophysical surveying with transmitter and receiver apparatus moving over the terrain while transported by vehicles moving on the earth or on, or through, snow, ice, water or air to accomplish geophysical surveys for the detection of electrically conductive bodies, including sulfide bodies containing nickel, copper, lead, zinc and/or other metals, metal treasure, aquifers or graphite deposits. In addition, it is further contemplated that the invention will be applicable for geophysical surveying with he apparatus stationary and not moving during the measurement interval.

Although the present invention has been described in conjunction with preferred embodiments, it is to be understood that modifications and variations may be resorted to without departing from the scope of the invention, as those skilled in the art will readily understand. Such modifications and variations are considered to be within the purview and scope of the invention and appended claims.

We claim:

1. Geophysical survey receiver apparatus for conducting continuously moving airborne geophysical surveys in conjunction with a primary field transmitter comprising:
    a. a receiver carrier having a longitudinal axis and adapted to be moved in airborne flight along the longitudinal axis;
    b. a first receiver coil mounted on the carrier;
    c. a second receiver coil connected to the first receiver coil and mounted on the carrier in a position of minimum coupling relationship to the first coil and with the plane of the windings of the second coil perpendicular to the plane of the windings of the first coil and intersecting the plane of the first coil windings in a first-second planar intersection line;
    d. said first and said second coils each being characterized by a capability for generating an electric signal from a first primary field and also characterized by mutually equal capabilities for generating electromotive force when subjected to identical excitation conditions;
    e. phase-shift means for introducing a 90° shift in the phase relationship of electric signals generated in the two coils when the coils are excited by an electromagnetic field at the frequency of the first primary field;
    f. means for combining electric signals generated in the first and second coils, and having a 90° phase shift introduced therein by said phase-shift means, to vectorially add the signals and thereby produce a first resultant signal having a magnitude responsive to both the phase and the magnitude of an electromagnetic field exciting said coils at the frequency of the first primary field;
    g. the aforesaid combination of receiver coils, phase-shift means and signal combining means being characterized by capability for maintaining electric signals from the first and second coils undistorted so as to maintain the forms of the signals and maintain the magnitude relationship of the signals to each other until the signals are combined; and
    h. a first resultant signal output means for transmitting the vectorially added first resultant signal.

2. An apparatus as set forth in claim 1 wherein the means for introducing the 90° phase shift comprises two tuning capacitors, one of said capacitors being connected in a parallel combination across the first receiver coil and the second capacitor being connected in a second parallel combination across the second receiver coil, and said phase-shift means is adapted for shifting the phase of one of the receiver coil signals 45° in one direction and shifting the phase of the other receiver coil signal 45° in the other direction with the aforesaid combinations of capacitors and receiver coils being tuned one to the upper half-power point and the other to the lower half-power point at the frequency of said first primary field.

3. An apparatus as set forth in claim 1 wherein the receiver carrier is adapted to be towed through the air and wherein the apparatus also comprises a powered aircraft, a transmitter coil mounted on the aircraft, a tow cable connecting the receiver carrier to the aircraft, means for receiving the vectorially added resultant signal transmitted from the signal output means of the receiver carrier and means for measuring and recording the magnitude of the resultant signal received from the receiver carrier output.

4. Geophysical survey receiver apparatus for conducting continuously moving geophysical surveys comprising:
    a. a receiver carrier having a longitudinal axis and adapted to be moved along the longitudinal axis;
    b. a first receiver coil mounted on the carrier;
    c. a second receiver coil connected to the first receiver coil and mounted on the carrier in a position of minimum coupling relationship to the first coil with the plane of the windings of the second coil perpendicular to the plane of the windings of the first coil and intersecting the plane of the first coil windings in a first-second planar intersection line and with the first and section coils disposed to orient the first-second planar intersection line perpendicular to a vertical plane through the longitudinal axis of the carrier;
    d. said first and said second coils each being characterized by a capability for generating an electric signal from a first primary field and also characterized by mutually equal capabilities for generating electromotive force when subjected to identical excitation conditions;
    e. phase-shift means for introducing a 90° shift in the phase relationship if electric signals generated in the two coils when the coils are excited by an electromagnetic field at the frequency of the first primary field;
    f. means for combining electric signals generated in the first and second coils, and having a 90° phase shift introduced therein by said phase-shift introduce therein by said phase-shift means, to vectorially add the signals and thereby produce a first resultant signal having a magnitude responsive to both the phase and the magnitude of an electromagnetic field exciting said coils at the frequency of the first primary field;
    g. the aforesaid combination of receiver coils, phase-shift means and signal combining means being characterized by capability for maintaining electric signals from the first and second coils undistorted so as to maintain the forms of the signals and maintain the magnitude relationship of the signals to each other until the signals are combined;

h. a first resultant signal output means for transmitting the vectorially added first resultant signal; and additionally comprising i. a third receiver coil mounted on the carrier with the plane of the third coil windings parallel to the longitudinal axis of the carrier, said third coil being characterized by a capability for generating a third coil signal from a second primary field at a second frequency different than the first primary filed frequency to produce a second resultant signal; and j. a second resultant signal output means for transmitting said second resultant signal.

5. An apparatus as set forth in claim 4 wherein the means for introducing the 90° phase shift comprises two tuning capacitors, one of said capacitors being connected in a parallel combination across the first receiver coil and the second capacitor being connected in a second parallel combination across the second receiver coil, and said phase shift means is adapted for shifting the phase of one of the receiver coil signals 45° in one direction nd shifting the phase of the other receiver coil signal 45° in the other direction with the aforesaid combinations of capacitors and receiver coils being tuned one to the upper half-power point and the other to the lower half-power point at the frequency of said first primary field.

6. An apparatus as set forth in claim 4 which additionally comprises a fourth receiver coil connected to the third coil and mounted on the carrier in a position of minimum coupling to the third coil and with the plane of the fourth coil windings perpendicular to the plane of the third coil windings, said fourth coil being characterized by a capability for generating from the second primary field a fourth coil signal at the frequency of the second primary field and characterized by a capability for generating an electromotive force equal to the electromotive force generated by the third coil when the third and the fourth coils are subjected to identical excitation conditions, means for introducing a 90° shift in the phase relationship of electric signals generated in the third coil and the forth coil when the third and fourth coils are excited by an electromagnetic field at the frequency of the second primary field, and distortion-free means for combining the fourth coil signal into the second resultant signal after introducing the 90° phase shift.

7. Geophysical surveying apparatus comprising, in combination with receiver apparatus in accordance with claim 4, a signal analysis circuit for comparing the magnitude of a first resultant signal from the first resultant signal output means with the magnitude of a second resultant signal from the second resultant signal output means and for producing a resultant difference signal responsive in magnitude to the difference between the magnitudes of the first resultant signal and the second resultant signal and a voltage recorder for recording the magnitude of the resultant difference signal.

8. Geophysical surveying apparatus for conducting airborne geophysical surveys comprising, in combination with apparatus in accordance with claim 7, a powered aircraft having attached thereto a first audiofrequency transmitter with a first transmitter coil for radiating a first audiofrequency primary field, a second audiofrequency transmitter with a second transmitter coil for radiating a second audiofrequency primary field perpendicular to said first field and a tow cable connected to the receiver carrier.

9. In a continuously moving airborne geophysical surveying process wherein a transmitter coil on a transmitter aircraft and a search coil on an airborne receiver carrier are flown over the terrain with the receiver carrier remote at a substantially constant distance from the transmitter aircraft and flexibly attached to the transmitter aircraft while the transmitter coil radiates an audiofrequency electromagnetic primary field and the search coil picks up an electric signal from the electromagnetic flux of the primary field and the magnitude of the search coil signal is measured, the improvement for suppressing orientation error noise that undesirably tends to arise in the search coil signal and result in undesired fluctuations in the measured magnitude of the signal when maneuver variations in the relative angular orientation of the receiver carrier to the transmitter aircraft cause variations in the angle at which the search coil intersects the flux of the primary field comprising:

a. picking up a second electric signal from said primary field with a second coil characterized by a signal pickup capability equal to the signal pickup capability of the search coil and disposed perpendicular to the search coil with the planes of the two coils intersecting in a line transverse to the primary field flux at the search coil and also disposed in zero mutual coupling relationship with said search coil;

b. maintaining the signal from the search coil and the signal from the second coil undistorted, whereby the forms of the signals and the magnitude relationship of the search coil signal to the second coil signal are maintained;

c. introducing a 90° shift in the phase relationship of the search coil signal and the second coil signal while maintaining the signals undistorted; and d. then combining the undistorted signals, with the 90° phase shift introduced therein, to vectorially add the two signals to each other and produce therefrom a resultant signal;

e. thereby obtaining from said primary field a resultant signal characterized by a magnitude that is representative of the magnitude of the primary field and remains essentially constant when the search coil and the second coil are rotated together in the primary field on an axis defined by the intersection of the planes of said two coils and thereby suppressing rotational orientation error noise that would otherwise arise if the search coil were rotated alone on said axis in the primary field.

10. A process as set forth in claim 9 wherein a secondary field, that is generated by the primary field in the terrain and radiated therefrom, is received along with the primary field at the search coil and at the second coil and introduces secondary field components into the search coil signal and into the second coil signal, and wherein the phase-shifting and signal combining operations recited respective to the primary field signals in claim 17 are also performed on the secondary field components to vectorially add the secondary field signal components together with the primary field signals and thereby obtain a resultant signal indicative, by comparison with signals received in the presence of the primary field alone, of the generation of a secondary field in the terrain under survey.

11. An electromagnetic geophysical survey process comprising:

a. radiating a first audiofrequency primary field over the terrain from a first transmitter coil mounted on a moving transmitter carrier and oriented with the coil axis parallel to a vertical plane through the direction of transmitter movement;

b. radiating a second primary field at a second audiofrequency different than the first audiofrequency from a second transmitter coil mounted on said moving transmitter carrier and oriented with the plane of the second transmitter coil windings parallel eo the direction of transmitter movement;

c. carrying a pair of mutually perpendicular first and second receiver coils on a receiver carrier moving at a substantially constant distance from the transmitter carrier and proximate to a vertical plane through the direction of transmitter carrier movement and also carrying a third receiver coil on said receiver carrier and oriented with the plane of the coil windings parallel to the vertical plane through the direction of transmitter carrier movement, said first and second receiver coils being disposed in a position of minimum mutual coupling and being characterized by mutually equal capability for generating electromotive forces when subjected to identical excitation excitations;

d. intercepting with said first and second receiver coils a first resultant electromagnetic field resulting from the first primary field and any copresent secondary field generated from the first primary field;

e. generating from the first resultant field electric signals in each of the first and second receiver coils at the same frequency as the first primary field frequency and responsive in phase and magnitude to the phase and magnitude of the first resultant field;

f. maintaining the two receiver coil signals undistorted so as to maintain the forms of the signals and the magnitude relationship of the signals to each other;

g. introducing a 90° shift in the phase relationship of the two receiver coil signals while maintaining the signals undistorted;

h. then combining the undistorted signals from the first and second receiver coils to vectorially add the signals and thereby produce a first resultant signal having a magnitude responsive to both the phase and the magnitude of the first resultant field;

i. intercepting with said third receiver coil a second resultant electromagnetic field resulting essentially from the second primary field;

j. generating from the second resultant field a second resultant electric signal in the third receiver coil at the same frequency as the second primary field frequency and responsive in phase and magnitude to the phase and magnitude of the second resultant field;

k. comparing the magnitude of the first resultant signal with the magnitude of the second resultant signal; and l. producing a resultant difference signal responsive in magnitude to the difference between the magnitudes of the first resultant signal and the second resultant signal.

12. A process as set forth in claim 11 wherein the 90° phase shift is introduced by shifting the phase of one of the receiver coil signals 45° in one direction and shifting the phase of the other receiver coil signal 45° in the other direction with the receiver coils tuned one to the upper half-power point and the other to the lower half-power point at the primary field frequency.

13. A process as set forth in claim 11 wherein a proportionate measure of a direct-current voltage component of the resultant signal is continuously recorded during at least a portion of the survey.

14. A process as set forth in claim 11 wherein the pair of mutually perpendicular first and second receiver coils is oriented with the planar intersection line, defined by the intersection of the plane of the windings of the first coil with the plane of the windings of the second coil, horizontal and perpendicular to a plane through the line of movement of the coils.

15. A process as set forth in claim 11 wherein the transmitter carrier is a powered aircraft moving in flight and the receiver carrier is a bird moving in tow behind said aircraft.

16. A process as set forth in claim 11 which additionally comprises carrying on the receiver carrier a fourth receiver coil essentially identical in size and inductance to the third receiver coil and disposed perpendicularly to and in zero mutual coupling relationship with the third coil, intercepting the second resultant field with the fourth coil and generating in the fourth coil electric signals at the same frequency as the second primary field frequency and responsive in phase and magnitude to the phase and magnitude of the second resultant field, introducing a 90° shift in the phase relationship of the third receiver coil signal and the fourth receiver coil signal and then combining said signals to vectorially add the fourth receiver coil signal into the second resultant signal before comparing the magnitude of the first resultant signal with the magnitude of the second resultant signal.

* * * * *

PO-1050
(5/69)

UNITED STATES PATENT OFFICE
CERTIFICATE OF CORRECTION

Patent No. 3,617,866    Dated November 2, 1971

Inventor(s) JOHN SHILLINGTON DOWSETT and RUSSEL DAVID LEASK

It is certified that error appears in the above-identified patent and that said Letters Patent are hereby corrected as shown below:

Front page, [72] Inventors, for "Russell" read -- Russel --; [73] Assignee, for "The International Company, Inc." read -- The International Nickel Company, Inc. --; under [56] References Cited, for "Cartler" read -- Cartier --; for "McLauglin" read -- McLaughlin --.

Column 1, line 65, for "ddsired" read -- desired --. Column 2, line 70, for "he" read -- the --. Column 3, line 42, for "lanes" read -- planes --. Column 5, line 8, for "single-search" read -- single search --; line 39, that portion of the equation reading "Cos$\theta$=SCos($\omega t$=90)" should read -- Cos$\theta$+SCos($\omega t$+90) --; lines 44 and 45, for "relationship" read -- as --; line 46, that portion of the equation reading "Cos$\theta$=Sin($\omega t$)" should read -- Cos$\theta$+Sin($\omega t$). Column 6, line 73, for "23" read -- 25 --. Column 7, line 14, for "monofrequdncy" read -- monofrequency --. Column 8, line 24, insert a period after "X-axis"; line 67, for "37" read -- 35 --. Column 10, line 11, for "on" read -- an --; line 21, for "78" read -- 0.78 --. Column 13, line 42, for "he" read -- the --. Column 14, line 61, for "if" read -- of --; lines 66 and 67, delete "introduce therein by said phase-shift". Column 15, line 22, for "nd" read -- and --. Column 16, line 61, for "eo" read -- to --; line 75, for "excitations;" read -- conditions; --.

Signed and sealed this 16th day of May 1972.

(SEAL)
Attest:

EDWARD M.FLETCHER,JR.                ROBERT GOTTSCHALK
Attesting Officer                     Commissioner of Patents